(12) United States Patent
Imura (10) Patent No.: US 11,322,925 B2
(45) Date of Patent: May 3, 2022

(54) OVERCURRENT DETECTION DEVICE, ENERGY STORAGE APPARATUS, AND CURRENT DETECTION METHOD

(71) Applicant: GS Yuasa International Ltd., Kyoto (JP)

(72) Inventor: Masayuki Imura, Kyoto (JP)

(73) Assignee: GS YUASA INTERNATIONAL LTD., Kyoto (JP)

(*) Notice: Subject to any disclaimer, the term of this patent is extended or adjusted under 35 U.S.C. 154(b) by 610 days.

(21) Appl. No.: 15/674,644

(22) Filed: Aug. 11, 2017

(65) Prior Publication Data

US 2018/0062371 A1 Mar. 1, 2018

(30) Foreign Application Priority Data

Aug. 23, 2016 (JP) .............................. JP2016-162501

(51) Int. Cl.
*H02H 7/18* (2006.01)
*H02H 1/00* (2006.01)
(Continued)

(52) U.S. Cl.
CPC ......... *H02H 1/0007* (2013.01); *B60L 3/0046* (2013.01); *H02H 3/087* (2013.01);
(Continued)

(58) Field of Classification Search
CPC .................. H02J 7/0031; H02J 7/0026; H02J 2007/0037; H02J 2007/0039;
(Continued)

(56) References Cited

U.S. PATENT DOCUMENTS 7,834,635 B2 * 11/2010 Oosawa .................... B60L 3/04
324/429
8,508,232 B2 8/2013 Yugou et al.
(Continued)

FOREIGN PATENT DOCUMENTS

EP    2 701 258 A1    2/2014
JP    2001-190086 A   7/2001
(Continued)

OTHER PUBLICATIONS

Extended European Search Report dated Feb. 7, 2018 in European Application No. 17185885.5.

*Primary Examiner* — Danny Nguyen
(74) *Attorney, Agent, or Firm* — McGinn IP Law Group, PLLC (57) ABSTRACT

An overcurrent detection device including: a current detection resistor that is connected in series to a main circuit and is configured to cause a potential difference at both ends according to a current flowing through the main circuit; a current detection circuit that includes a pair of connection portions and is configured to detect a potential difference between the pair of connection portions; a pair of voltage detection lines connecting the both ends of the current detection resistor to the pair of connection portions in the current detection circuit; and an erroneous detection prevention unit configured to prevent an increase in the potential difference between the pair of connection portions when at least any one of the pair of voltage detection lines has a connection failure.

17 Claims, 6 Drawing Sheets

(51) Int. Cl.
*B60L 3/00* (2019.01)
*H02J 7/00* (2006.01)
*H02H 3/087* (2006.01)
*G01N 27/416* (2006.01)

(52) U.S. Cl.
CPC ............. *H02H 7/18* (2013.01); *H02J 7/0029* (2013.01); *G01N 27/416* (2013.01); *H02H 1/00* (2013.01); *H02J 7/00304* (2020.01)

(58) Field of Classification Search
CPC ......... B60L 2240/547; B60L 2240/549; B60L 3/04; G01R 31/36; G01R 31/3648; G01N 27/416; H02H 1/00; H02H 7/18; B60R 16/0231; B60R 16/023; B60R 16/02
USPC ............ 361/86–87, 93.7–93.9; 320/120, 136
See application file for complete search history.

(56) References Cited

U.S. PATENT DOCUMENTS

| | | | |
|---|---|---|---|
| 2008/0143298 A1* | 6/2008 | Yoshida | H01M 10/42 320/136 |
| 2009/0132188 A1 | 5/2009 | Watanabe | |
| 2009/0273872 A1 | 11/2009 | Cordes et al. | |
| 2010/0176764 A1 | 7/2010 | Tachikawa et al. | |
| 2011/0057658 A1* | 3/2011 | Yugou | H02J 7/0013 324/426 |
| 2011/0104525 A1* | 5/2011 | Kim | H01M 2/34 429/50 |
| 2017/0089955 A1* | 3/2017 | Yugou | G01R 31/396 |
| 2017/0106820 A1 | 4/2017 | Maruyama et al. | |
| 2018/0141506 A1* | 5/2018 | Yamashita | B60R 16/02 |
| 2018/0188326 A1* | 7/2018 | Huh | G01R 19/16504 |

FOREIGN PATENT DOCUMENTS

| | | |
|---|---|---|
| JP | 2008-178276 A | 7/2008 |
| JP | 2009-122056 A | 6/2009 |
| JP | 2016-183679 A | 8/2010 |
| JP | 2011-058851 A | 3/2011 |
| JP | 2011-101589 A | 5/2011 |
| JP | 2012-145333 A | 8/2012 |
| JP | 2012-217276 A | 11/2012 |
| JP | 2016-020178 A | 2/2016 |

* cited by examiner

OVERCURRENT DETECTION DEVICE, ENERGY STORAGE APPARATUS, AND CURRENT DETECTION METHOD

CROSS-REFERENCE TO RELATED APPLICATIONS

This application is based on Japanese Patent Application No. 2016-162501 filed on Aug. 23, 2016, the entire contents of which are hereby incorporated by reference.

FIELD

The technique disclosed herein relates to an overcurrent detection device, an energy storage apparatus, and a current detection method.

BACKGROUND

JP 2016-20178 A discloses a power supply control system including a current detector.

The current detector includes a sense resistor connected in series to a power line, a pair of wiring lines connected to both ends of the sense resistor, and a CPU connected through a comparator provided at terminals of the pair of wiring lines. The voltages across the sense resistor are input into the comparator through the pair of wiring lines, and a signal is input from the comparator into the CPU, whereby the current in the power line can be detected.

In the case of such a current detector, if a connection failure occurs in any one wiring line of the pair of wiring lines, the input side of the comparator becomes a high impedance state very close to the open state. Then, when the wiring line receives a large noise, the voltage difference on the input side of the comparator becomes large, so that the CPU erroneously detects that it is an overcurrent. Therefore, when a current shutoff device or the like is installed, the current is shut off in the current shutoff device and the electric power cannot be supplied.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

A technique for preventing an erroneous detection of overcurrent is disclosed herein.

The technique disclosed herein is an overcurrent detection device including: a current detection resistor that is connected in series to a main circuit and is configured to cause a potential difference at both ends according to a current flowing through the main circuit; a current detection circuit that includes a pair of connection portions and is configured to detect a potential difference between the pair of connection portions; a pair of voltage detection lines connecting the both ends of the current detection resistor to the pair of connection portions in the current detection circuit; and an erroneous detection prevention unit configured to prevent an increase in the potential difference between the pair of connection portions when at least one of the pair of voltage detection lines has a connection failure.

BRIEF DESCRIPTION OF DRAWINGS

The foregoing and other features of the present invention will become apparent from the following description and drawings of an illustrative embodiment of the invention in which.

DESCRIPTION OF EMBODIMENTS

The technique disclosed herein is an overcurrent detection device including: a current detection resistor that is connected in series to a main circuit and is configured to cause a potential difference at both ends according to a current flowing through the main circuit; a current detection circuit that includes a pair of connection portions and is configured to detect a potential difference between the pair of connection portions; a pair of voltage detection lines connecting the both ends of the current detection resistor to the pair of connection portions in the current detection circuit; and an erroneous detection prevention unit configured to prevent an increase in the potential difference between the pair of connection portions when at least one of the pair of voltage detection lines has a connection failure.

According to the technique disclosed herein, the potential difference between the pair of connection portions can be prevented from abnormally increasing due to noise or the like, and the current detection circuit can be prevented from an erroneous detection of overcurrent.

SUMMARY OF PRESENT EMBODIMENT

First, a summary of an overcurrent detection device and an energy storage apparatus disclosed herein will be described.

The overcurrent detection device disclosed herein includes: a current detection resistor that is connected in series to a main circuit and is configured to cause a potential difference at both ends according to a current flowing through the main circuit; a current detection circuit that includes a pair of connection portions and is configured to detect a potential difference between the pair of connection portions; a pair of voltage detection lines connecting the both ends of the current detection resistor to the pair of connection portions in the current detection circuit; and an erroneous detection prevention unit configured to prevent an increase in the potential difference between the pair of connection portions when at least any one of the pair of voltage detection lines has a connection failure.

The energy storage apparatus disclosed herein includes: an assembled battery; the overcurrent detection device; and a current shutoff device configured to shut off a current of the assembled battery based on a detection result of the overcurrent detection device.

According to the overcurrent detection device and the energy storage apparatus, even if a connection failure occurs in the voltage detection line, the impedance on the input side of the current detection circuit can be prevented from rising unlimitedly because the erroneous detection prevention unit is connected to the pair of connection portions in the current detection circuit. Thus, the potential difference between the pair of connection portions can be prevented from abnormally increasing due to noise or the like, and the current detection circuit can be prevented from the erroneous detection of the overcurrent.

The erroneous detection prevention unit may be configured to include a resistance element connected between the pair of connection portions, the resistance element having higher resistance than the current detection resistor.

Here, the resistance element having higher resistance than the current detection resistor may mean a resistance element having such very high resistance compared to the current detection resistor (i.e., the resistance of the current detection resistor is vanishingly small compared to the resistance element).

According to this configuration, the erroneous detection of the overcurrent can be prevented with a simple configuration, in which a resistance element having higher resistance than the current detection resistor is connected between the pair of connection portions.

The erroneous detection prevention unit may include resistance elements respectively connected between the connection portions and a reference voltage line, each resistance element having higher resistance than the current detection resistor.

According to this configuration, the erroneous detection of the overcurrent can be prevented with a simple configuration in which a resistance element having higher resistance than the current detection resistor is connected between each of the connection portions and the reference voltage line.

First Embodiment

An embodiment disclosed herein will be described with reference to FIGS. 1 to 5.

Figure 1:
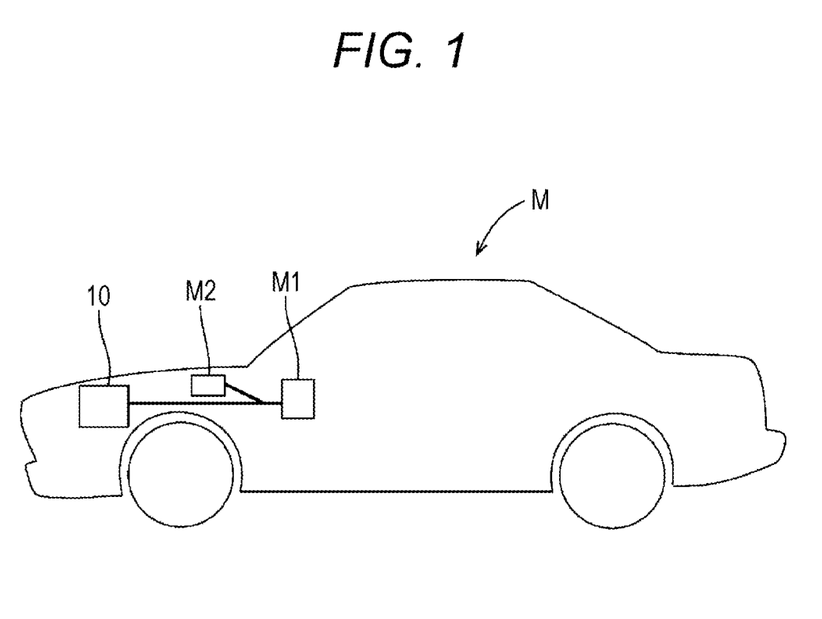
FIG. 1 is a diagram showing a state in which an energy storage apparatus according to a first embodiment is mounted in a car.

As shown in FIG. 1, the present embodiment shows an energy storage apparatus 10 for engine starting, which is mounted in an engine room (not shown) of a vehicle M such as a car. The energy storage apparatus 10 supplies electric power to an electronic control device M1 of the vehicle M and is connected to a vehicle-side charger M2 such as an alternator controlled by the electronic control device M1.

Figure 2:
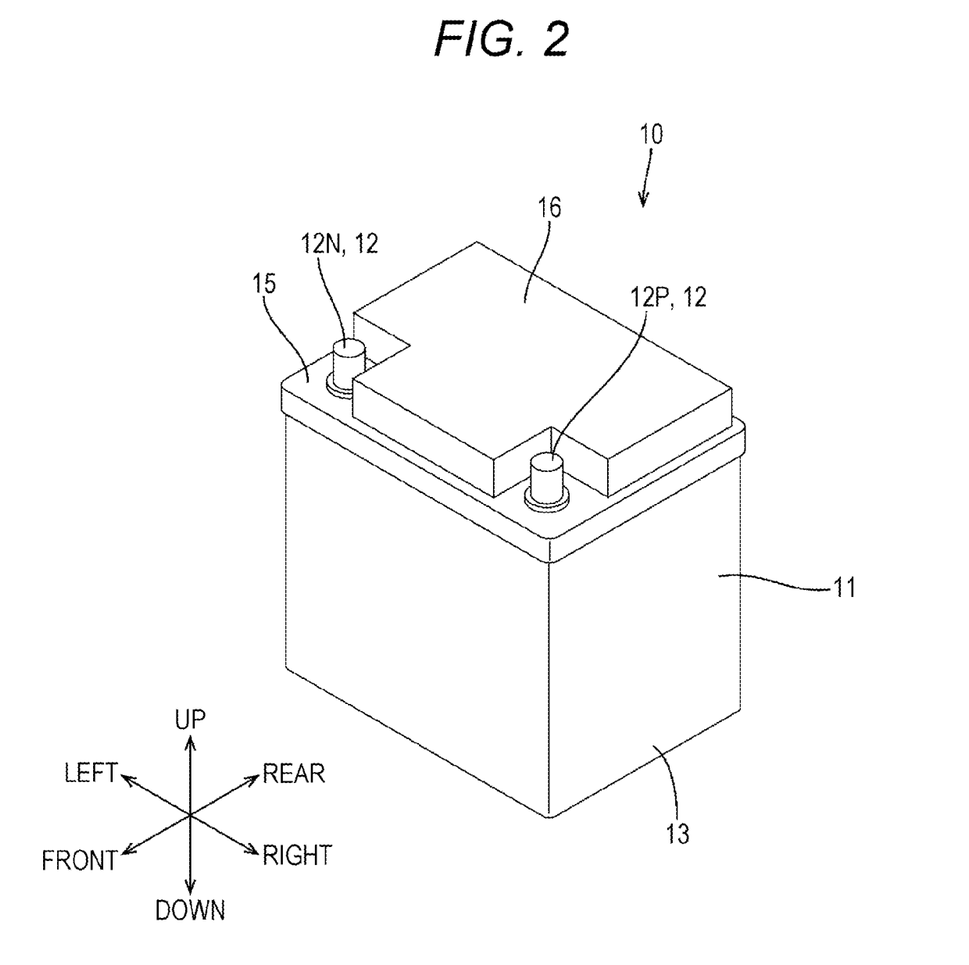
FIG. 2 is a perspective view of the energy storage apparatus.

As shown in FIG. 2, the energy storage apparatus 10 includes a block-shaped battery case 11. Inside the battery case 11, as shown in FIG. 3, an assembled battery 20 formed by connecting a plurality (four in the present embodiment) of energy storage devices 21 in series, a control board 18, and the like are housed.

Figure 3:
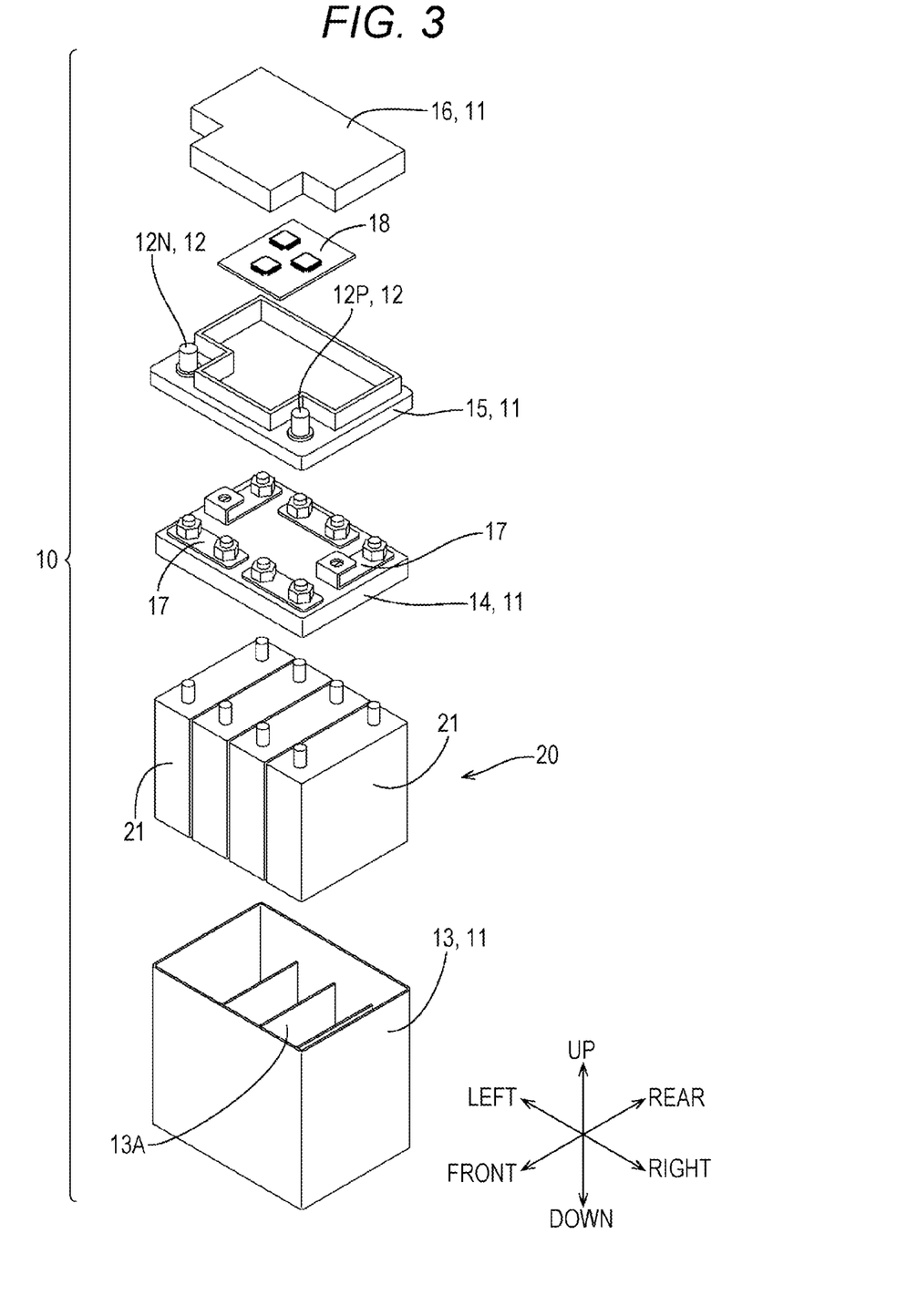
FIG. 3 is an exploded perspective view of the energy storage apparatus.

In the following description, when FIGS. 2 and 3 are referred to, the vertical direction is based on the vertical direction of the battery case 11 when it is placed horizontally without inclination with respect to the installation surface; and the front-rear direction is based on the direction along the short side of the battery case 11 (depth direction), in which the left front side shown in the figures is set as the front side. In addition, the left-right direction is based on the direction along the long side of the battery case 11, and the right front side shown in the figures is set as the right direction.

The battery case 11 is made of synthetic resin, and as shown in FIG. 3, includes a box-shaped case body 13 opening upward, a positioning member 14 for positioning the energy storage devices 21, an inner lid 15 mounted on the upper portion of the case body 13, and an upper lid 16 mounted on the upper portion of the inner lid 15.

In the case body 13, as shown in FIG. 3, a plurality of cell chambers 13A in which the plurality of energy storage devices 21 are individually accommodated are provided side by side in the left-right direction.

The energy storage device 21 may be a lithium ion battery using, for example, a negative active material of a graphite-based material and an iron phosphate-based positive active material such as lithium iron phosphate.

In the positioning member 14, as shown in FIG. 3, a plurality of bus bars 17 are arranged on the upper face. Disposing the positioning member 14 on top of the four energy storage devices 21 contained in the case body 13 causes the four energy storage devices 21 to be positioned and to be connected in series with the bus bars 17.

As shown in FIGS. 2 and 3, the inner lid 15 has an approximately rectangular shape in a plan view, and has a shape with a height difference in the left-right direction. A pair of external terminal units 12, to which battery terminals (not shown) provided in the vehicle M are connected, is embedded in the inner lid 15. The pair of external terminal units 12 is made of, for example, a metal such as a lead alloy. For example, the right one of the pair of external terminal units 12 is a positive electrode terminal unit 12P, and the left one is a negative electrode terminal unit 12N.

As shown in FIG. 2, the inner lid 15 can accommodate the control board 18 therein, and when the inner lid 15 is mounted on the case body 13, the assembled battery 20 and the control board 18 are electrically connected to each other.

Next, the electrical configuration of the energy storage apparatus 10 will be described with reference to FIG. 4.

Figure 4:
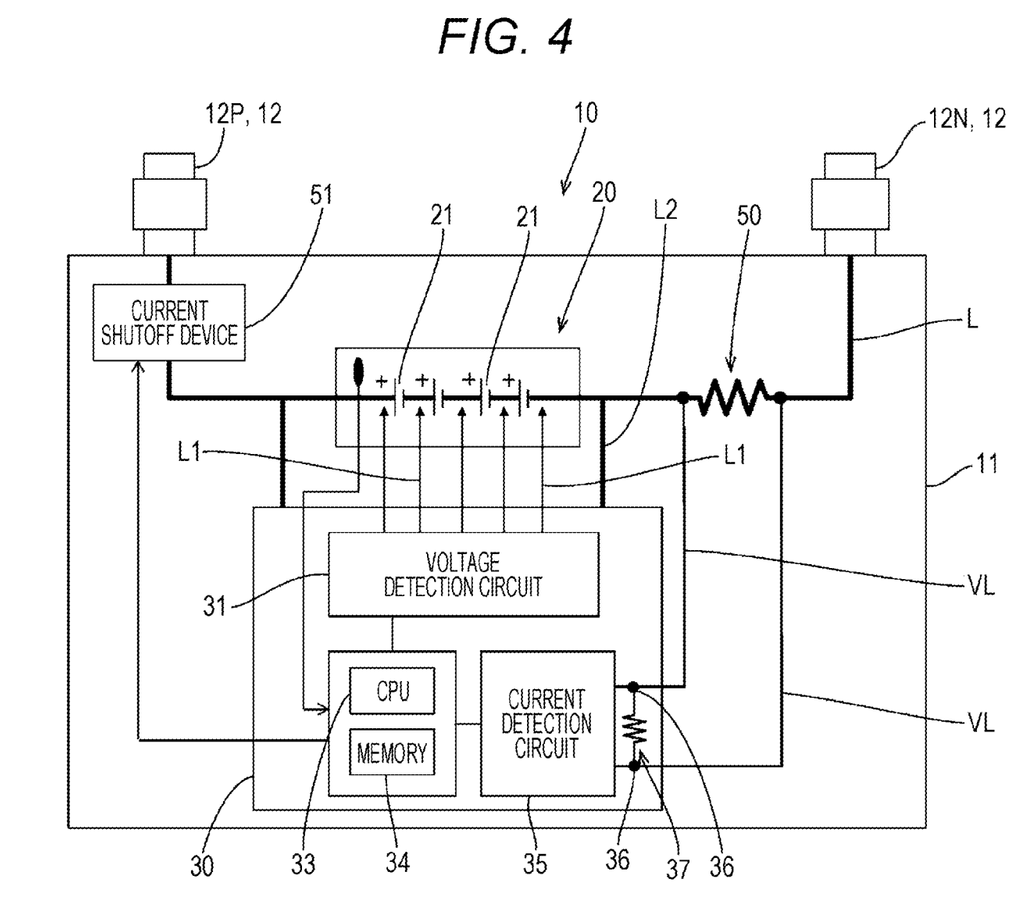
FIG. 4 is a block diagram showing an electrical configuration of the energy storage apparatus according to the first embodiment.

As shown in FIG. 4, the energy storage apparatus 10 includes the assembled battery 20, a battery management unit (hereinafter referred to as "BMU") 30, a current detection resistor 50, and a current shutoff device 51.

The assembled battery 20, the current detection resistor 50, and the current shutoff device 51 are connected in series through a current path L, a positive electrode of the assembled battery 20 is connected to the positive electrode terminal unit 12P through the current shutoff device 51, and a negative electrode is connected to the negative electrode terminal unit 12N through the current detection resistor 50.

The current detection resistor 50 is what is called a sense resistor that detects the current in the current path L, and is, for example, a low-resistance resistor of several tens of mΩ to several hundreds of mΩ. The current detection resistor 50 is connected to the BMU 30 through a pair of voltage detection lines VL connected to both ends of the current detection resistor 50.

The current shutoff device 51 may be a relay or a semiconductor switch such as an N-channel FET. The current shutoff device 51 operates in response to drive instructions from the BMU 30 to shut off the energization between the assembled battery 20 and the positive electrode terminal unit 12P.

The BMU 30 includes a voltage detection circuit 31, a CPU 33 being a central processing unit, a memory 34, and a current detection circuit 35, which are mounted on the control board 18. The BMU 30 is supplied with electric power from the assembled battery 20 by being connected to the current path L through a power line L2. The configuration obtained by combining the current detection circuit 35 in the battery management unit 30 with the current detection resistor 50 corresponds to an overcurrent detection device.

The voltage detection circuit 31 is connected to both ends of each energy storage device 21 through a plurality of (five in the present embodiment) cell voltage detection lines L1, and outputs the cell voltage of each energy storage device 21 and the battery voltage of the assembled battery 20 (total voltage of the plurality of energy storage devices 21) to the CPU 33.

The memory 34 includes a nonvolatile memory such as a flash memory or an EEPROM, for example. The memory 34 stores various kinds of programs for managing each energy storage device 21 or the assembled battery 20, and data necessary for executing the various kinds of programs, such as an overcurrent detection threshold value of the assembled battery 20.

The current detection circuit 35 has a pair of connection portions 36 to which a pair of voltage detection lines VL extending from both ends of the current detection resistor 50 are connected. The potential difference between both ends of the current detection resistor 50 is input into the pair of connection portions 36 through the pair of voltage detection lines VL. Thus, the current detection circuit 35 detects the sense voltage of the current detection resistor 50 from the potential difference between the pair of connection portions 36.

In other words, the pair of voltage detection lines VL are connected in such a manner as to connect the both ends of the current detection resistor 50 to the pair of connection portions 36 in the current detection circuit 35 on the control board 18, and the potential difference between the both ends of the current detection resistor 50 is input into the pair of connection portions 36 of the current detection circuit 35. Thus, the current detection circuit 35 can detect the sense voltage of the current detection resistor 50.

Then, the current detection circuit 35 obtains the current flowing through the current path L based on the detected sense voltage and the resistance value of the current detection resistor 50 to output the obtained current to the CPU 33 as the current through the assembled battery 20.

The CPU 33 monitors and controls each unit based on the received various kinds of signals and the program read from the memory 34.

Specifically, inputting the outputs from the voltage detection circuit 31 and the current detection circuit 35 causes the CPU 33 to monitor, at all times or periodically, the voltages of the energy storage device 21 and the assembled battery 20 as well as the current through the assembled battery 20.

When the CPU 33 detects abnormality in the voltages of the energy storage device 21 and the assembled battery 20, since a malfunction may have occurred in the energy storage device 21 or the assembled battery 20, the CPU 33 causes the current shutoff device 51 to operate to shut off the energization between the assembled battery 20 and the positive electrode terminal unit 12P. In addition, when the CPU 33 detects that the current through the assembled battery 20 is equal to or more than the overcurrent detection threshold value stored in the memory 34, the CPU 33 determines that the assembled battery 20 may become the overcurrent state. Accordingly, the CPU 33 causes the current shutoff device 51 to operate to shut off the energization between the assembled battery 20 and the positive electrode terminal unit 12P. Thus, the CPU 33 prevents the occurrence of a malfunction in the energy storage device 21 and the assembled battery 20.

As shown in FIG. 4, an erroneous detection prevention unit 37 is connected between the pair of connection portions 36 in the current detection circuit 35.

The erroneous detection prevention unit 37 may be a resistor having such very high resistance compared to the current detection resistor 50 (i.e., the resistance of the current detection resistor 50 is vanishingly small compared to the resistor). For example, the erroneous detection prevention unit 37 is a high-resistance resistor of several tens of Ω to several hundreds of kΩ, which is about one thousand to one million times the resistance of the current detection resistor 50.

The present embodiment has the above-described configuration, and subsequently, the functions and the effects of the energy storage apparatus 10 will be described.

In the energy storage apparatus 10, the both ends of the current detection resistor 50 are connected to the pair of connection portions 36 of the current detection circuit 35, by the pair of voltage detection lines VL. If, for example, a connection failure occurs in any one voltage detection line VL of the pair of voltage detection lines VL due to some cause such as the vibration of the vehicle M, the voltage detection line VL where a connection failure occurs becomes a high impedance state.

Figure 5:
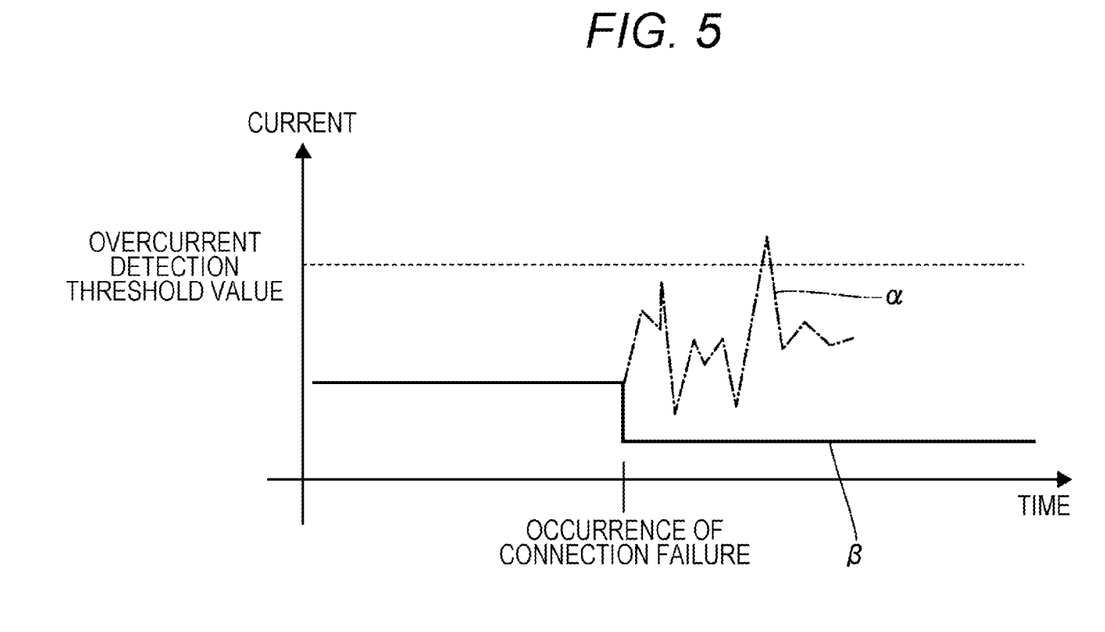
FIG. 5 is a graph schematically showing the transition of a current detected by a current detection circuit.

In such a state, when the voltage detection line VL receives noise, the voltage difference between the pair of connection portions 36 increases as indicated with the alternate long and short dashed line α in FIG. 5. Consequently, the current detected in the current detection circuit 35 may become equal to or more than the overcurrent detection threshold value, and the CPU 33 may erroneously detect that the assembled battery 20 is in an overcurrent state. If the CPU 33 performs erroneous detection, operating the current shutoff device 51 causes the energization between the assembled battery 20 and the positive electrode terminal unit 12P to be shut off, and does not allow the energy storage apparatus 10 to supply electric power.

According to the present embodiment, the erroneous detection prevention unit 37 including a resistor is connected between the pair of connection portions 36 in the current detection circuit 35. Therefore, even if a connection failure occurs in the voltage detection line VL, the current detection circuit 35 detects the potential difference across the erroneous detection prevention unit 37. Thus, the potential difference can be reduced to or less than a predetermined value, and the impedance between the pair of connection portions 36 can be prevented from rising unlimitedly.

In other words, preventing the potential difference between the pair of connection portions 36 from abnormally increasing due to noise or the like allows the current detected in the current detection circuit 35 to be reduced to or less than a predetermined value as indicated with the solid line β in FIG. 5. The current detection circuit 35 can, thus, be prevented from the erroneous detection of the overcurrent. Thus, it can be prevented that the energization between the assembled battery 20 and the positive electrode terminal unit 12P is shut off due to the connection failure occurring in the voltage detection line VL and it can be prevented that electric power cannot be supplied from the energy storage apparatus 10.

According to the present embodiment, a simple configuration is employed, in which the erroneous detection prevention unit 37 having such very high resistance compared to the current detection resistor 50 of which resistance is vanishingly small is connected between the pair of connection portions 36. The simple configuration allows the potential difference between the pair of connection portions 36 to be reduced to or less than a predetermined value even if a connection failure occurs in the voltage detection line VL. Since the current detection circuit can be prevented from the erroneous detection of the overcurrent, it can be prevented that electric power cannot be supplied from the energy storage apparatus 10 due to the occurrence of a connection failure in the voltage detection line VL.

Second Embodiment

Figure 6:
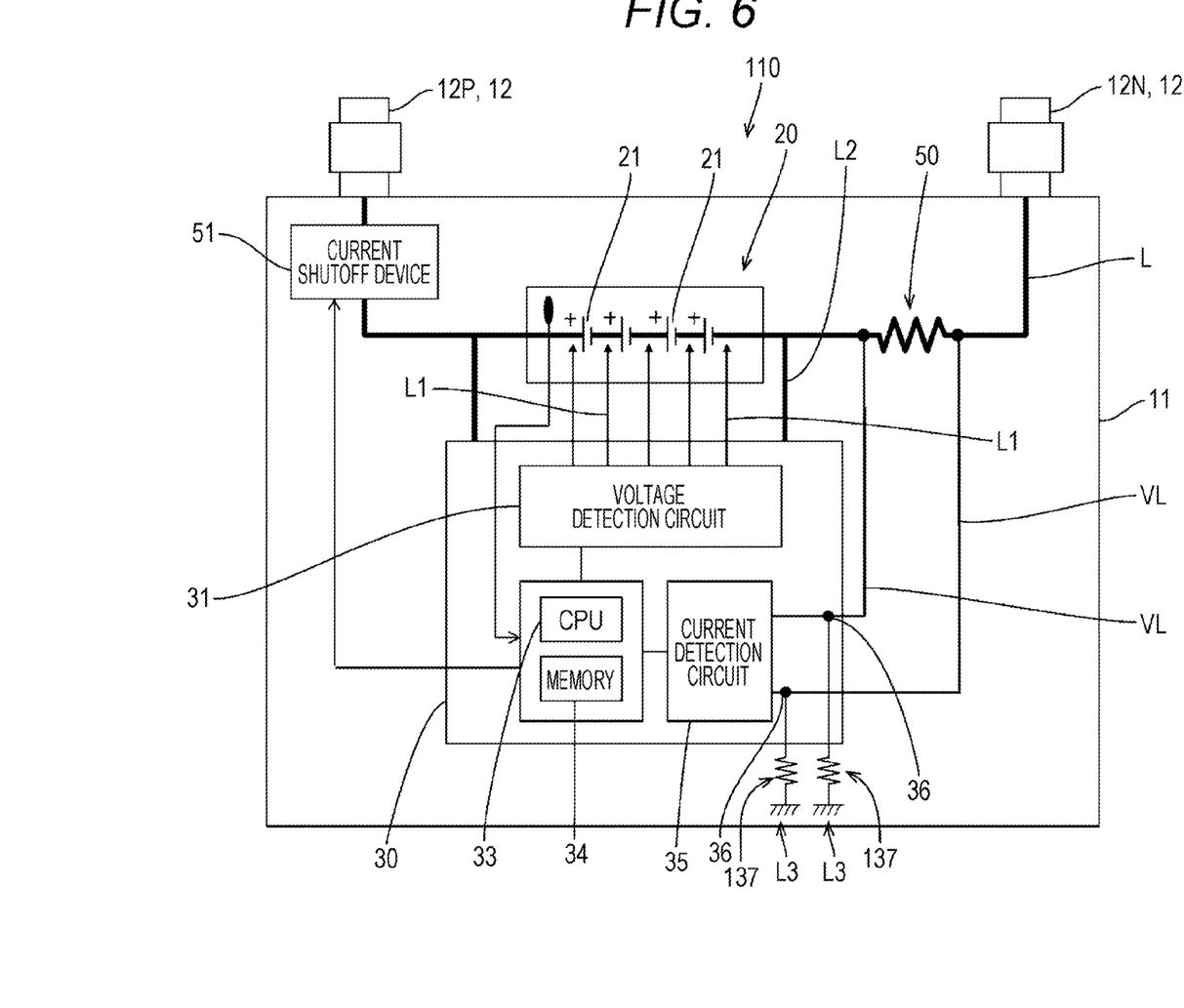
FIG. 6 is a block diagram showing an electrical configuration of an energy storage apparatus according to a second embodiment.

Next, a second embodiment will be described with reference to FIG. 6.

In an energy storage apparatus according to the second embodiment 110, the connection of the erroneous detection prevention unit 37 is changed from the first embodiment. As to the configuration, function, and effect common to the first embodiment, the detailed description is omitted. In addition, the same reference numerals are used for the same configuration as that of the first embodiment.

Each of the erroneous detection prevention units 137 in the second embodiment is provided between a corresponding one of the connection portions 36 and the GND line L3 being a reference voltage line of the energy storage apparatus 110. The erroneous detection prevention units 137 connect the connection portions 36 to the GND line L3.

As with the first embodiment, each of the erroneous detection prevention units 137 is a resistor having such very high resistance compared to the current detection resistor 50, and for example, is a high-resistance resistor of several tens of Ω to several hundreds of kΩ, which is about one thousand to one million times the resistance of the current detection resistor 50.

As described above, also in the present embodiment, the erroneous detection prevention unit 137 having such very high resistance compared to the current detection resistor 50 is provided between each of the connection portions 36 and the GND line L3. This allows the potential difference detected by the current detection circuit 35 to be reduced to or less than a predetermined value, and the current detection circuit 35 to be prevented from the erroneous detection of the overcurrent due to noise or the like even if a connection failure occurs in the voltage detection line VL.

In other words, the current shutoff device 51 is prevented from operating due to a connection failure occurring in the voltage detection line VL, and it can be prevented that electric power cannot be supplied from the energy storage apparatus 110.

Other Embodiments

The technique disclosed herein is not limited to the embodiments described by the above description and drawings, and includes, for example, various aspects as follows.

(1) In the above embodiments, the erroneous detection prevention unit 37 is applied to the energy storage apparatus 10 for engine starting for the vehicle M. However, the present invention is not limited to this, and the erroneous detection prevention unit may be applied to an energy storage apparatus for motor driving or an energy storage apparatus for a two-wheeled vehicle.

(2) In the above embodiments, the erroneous detection prevention unit 37 or 137 is constituted by a resistor having very high resistance compared to the current detection resistor 50. However, the present invention is not limited to this, and a voltage drop element for reducing the potential difference between the pair of connection portions may be configured in such a manner that the current detected by the current detection circuit does not reach or exceed the overcurrent detection threshold value.

(3) Since the energy storage apparatus 10 needs to be protected, the time between detection of the overcurrent and start of the operation of the current shutoff device 51 (delay time) is short. In the energy storage apparatus 10, an overcurrent typically flows when an external short circuit occurs. The external short circuit occurs, for example, when a user at the time of battery replacement of vehicles or an operator at the time of battery incorporation into vehicles erroneously forces the positive electrode terminal unit 12P and the negative electrode terminal unit 12N into conduction. Other examples in which the external short circuit may occur include the case where a load connected to the energy storage apparatus 10 fails and the load is short-circuited and the case where the positive electrode terminal unit 12P touches the vehicle body panel at the time of vehicle collision. When such an external short circuit occurs, the BMU 30, the assembled battery 20, and further the load connected to the energy storage apparatus 10 are subject to damage unless the current shutoff device 51 immediately starts its operation to shut off the current path L. Therefore, the CPU 33 of the BMU 30 immediately shuts off the current path L with the current shutoff device 51. That is, the delay time between the detection of the overcurrent and the start of the operation of the current shutoff device 51 is set extremely short.

In determining other conditions (the overvoltage, the overtemperature, and the like) other than the overcurrent, performing the sensing plural times to ignore abnormal values, obtaining an average value, or performing fault diagnosis of sensors and detection lines may be considered, taking the possibility that the sensor output at a certain point in time is an error value into account. These allow the influence of noise or the influence of sensor malfunction to be reduced. In determining the overcurrent, for the above reason (the reason of protecting the BMU 30, the assembled battery 20, and the load connected to the energy storage apparatus 10), there is no time margin for performing the sensing plural times, obtaining the average value, or performing the fault diagnosis.

Therefore, a case where an overcurrent really flows due to an external short circuit or the like cannot be distinguished from a case where a voltage detection line disconnection or connection failure occurs and noises appear in the voltage detection line VL. Consequently, there is a high possibility of erroneously detecting the disconnection or connection failure as an overcurrent.

In the above embodiment, even if disconnection or connection failure occurs in the voltage detection line VL, the potential difference between the pair of connecting portions 36 can be reduced to a predetermined value or less and the influence of noise can be prevented, by the added resistor 37 or 137. Therefore, even when the delay time is short, the possibility of erroneously detecting the disconnection or connection failure as an overcurrent is reduced. The possibility of erroneous detection can be lowered even when the fault diagnosis is not performed (there is a possibility of erroneous detection only when an open fault occurs in both the current detection resistor 50 and the resistor 37 or 137).

(4) If the disconnection or connection failure of the voltage detection line VL is erroneously detected as an overcurrent and the current shutoff device 51 is operated to cause power-fail (power supply is stopped), a vehicle driving trouble, such as the loss of a power steering function, may occur. Mounting the energy storage apparatus 10 of the present invention in a vehicle prevents the occurrence of such a trouble.

(5) In the above embodiments, an overcurrent detection device is provided inside the energy storage apparatus 10. The overcurrent detection device may be provided on the side of a device to which the energy storage apparatus 10 supplies power. For example, when the energy storage apparatus 10 is mounted in a vehicle, the overcurrent detection device may be provided inside the vehicle and outside the energy storage apparatus 10. The overcurrent detection device includes the current detection circuit 35, the current detection resistor 50, the voltage detection line VL, and the resistors 37 and 137 being the erroneous detection prevention units. These components 35, 50, VL, 37, and 137 may be disposed inside the vehicle and outside the energy storage apparatus 10.

(6) The present invention may be implemented as any one of the following methods. A method for preventing erroneous detection of an overcurrent detection device, in which the overcurrent detection device includes: a current detection resistor that is connected in series to a main circuit and is configured to cause a potential difference at both ends according to a current flowing through the main circuit; a current detection circuit that includes a pair of connection portions and is configured to detect a potential difference between the pair of connection portions; and a pair of voltage detection lines connecting the both ends of the current detection resistor to the pair of connection portions in the current detection circuit. The method prevents an increase in a potential difference between the pair of connection portions, using an erroneous detection prevention unit, when at least any one of the pair of voltage detection lines has a connection failure, thereby preventing the erroneous detection of the overcurrent detection device.

(7) A current detection method for an energy storage device including: detecting a voltage drop in a current detection resistor connected in series to the energy storage device by using a pair of detection lines connected to the current detection resistor; and preventing an increase in a potential difference between the pair of detection lines, using an erroneous detection prevention unit, when at least any one of the pair of detection lines becomes connection failure.

(8) The current detection method, further including shutting off a current path with a current shutoff device connected in series with the energy storage device and the current detection resistor when a current value detected by the current detection resistor is equal to a threshold value or more (e.g., when an external short circuit occurs).

(9) The current detection method, in which the energy storage device constitutes a battery mounted in a vehicle.

(10) The current detection method, in which the erroneous detection prevention unit comprises a resistance element connected between the pair of detection lines, the resistance element having higher resistance than the current detection resistor.

(11) The current detection method, in which the erroneous detection prevention unit comprises resistance elements respectively connected between the pair of detection lines and a reference voltage line, each resistance element having higher resistance than the current detection resistor.

What is claimed is:

1. An overcurrent detection device comprising:
a current detection resistor that is connected in series to a main circuit and is configured to cause a potential difference at both ends according to a current flowing through the main circuit;
a current detection circuit that includes a pair of connection portions and is configured to detect a potential difference between the pair of connection portions;
a pair of voltage detection lines connecting the both ends of the current detection resistor to the pair of connection portions in the current detection circuit; and
an erroneous detection prevention unit configured to reduce the potential difference between the pair of connection portions to a predetermined value or less when at least any one of the pair of voltage detection lines has a disconnection or connection failure,
wherein the erroneous detection prevention unit comprises a resistance element connected between the pair of connection portions, the resistance element having higher resistance than the current detection resistor.

2. An overcurrent detection device comprising:
a current detection resistor that is connected in series to a main circuit and is configured to cause a potential difference at both ends according to a current flowing through the main circuit;
a current detection circuit that includes a pair of connection portions and is configured to detect a potential difference between the pair of connection portions;
a pair of voltage detection lines connecting the both ends of the current detection resistor to the air of connection portions in the current detection circuit; and
an erroneous detection prevention unit configured to prevent an increase in the potential difference between the pair of connection portions when at least any one of the pair of voltage detection lines has a disconnection or connection failure,
wherein the erroneous detection prevention unit comprises:
a first resistance element connected between a first connection portion of the pair of connection portions and a reference voltage line; and
a second resistance element connected between a second connection portion of the pair of connection portions and the reference voltage line, and
wherein each of the first and second resistance elements has a resistance value that is greater than a resistance value of the current detection resistor.

3. An energy storage apparatus comprising:
an assembled battery;
the overcurrent detection device according to claim 1; and
a current shutoff device configured to shut off a current of the assembled battery based on a detection result of the overcurrent detection device.

4. A current detection method for an energy storage device comprising:
detecting a voltage drop in a current detection resistor connected in series to the energy storage device by using a pair of detection lines connected to the current detection resistor;
preventing an increase in a potential difference between the pair of detection lines, using an erroneous detection prevention unit, when at least any one of the pair of detection lines becomes a disconnection or connection failure; and
shutting off a current path with a current shutoff device connected in series with the energy storage device and the current detection resistor when a current value detected by the current detection resistor is equal to a threshold value or more.

5. The current detection method according to claim 4, wherein the energy storage device constitutes a battery mounted in a vehicle.

6. The current detection method according to claim 4, wherein the erroneous detection prevention unit comprises a resistance element connected between the pair of detection lines, the resistance element having higher resistance than the current detection resistor.

7. The current detection method according to claim 4, wherein the erroneous detection prevention unit comprises:
a first resistance element connected between a first detection line of the pair of detection lines and a reference voltage line; and
a second resistance element connected between a second detection line of the pair of detection lines and the reference voltage line,
wherein each of the first and second resistance elements has a resistance value that is greater than a resistance value of the current detection resistor.

8. An energy storage apparatus comprising:
a current detection resistor that is connected in series to a main circuit on a current path;
a current detection circuit that includes a pair of connection portions and detects a potential difference across the current detection resistor;
a pair of voltage detection lines that connects the ends of the current detection resistor to the pair of connection portions, respectively;
an erroneous detection prevention unit that is connected to at least one connection portion of the pair of connection portions and prevents an erroneous detection of overcurrent in the current path;
a battery management unit comprising:
the current detection circuit; and
a central processing unit (CPU) that monitors current in the current path based on an output of the current detection circuit; and
a current shutoff device that shuts off the current in the current path when the CPU detects that the current is equal to or greater than an overcurrent detection threshold value.

9. The energy storage apparatus of claim 8, wherein the erroneous detection prevention unit comprises a resistance element having a resistance value that is greater than a resistance value of the current detection resistor.

10. The energy storage apparatus of claim 9, wherein the resistance value of the erroneous detection prevention unit is in a range from one thousand times the resistance value of the current detection resistor to one million times the resistance of the current detection resistor.

11. The energy storage apparatus of claim 8, wherein the erroneous detection prevention unit comprises:
a first resistance element connected between a first connection portion of the pair of connection portions and a reference voltage line; and
a second resistance element connected between a second connection portion of the pair of connection portions and the reference voltage line, and
wherein each of the first and second resistance elements comprise a resistance value that is greater than a resistance value of the current detection resistor.

12. The energy storage apparatus of claim 8, wherein the battery management unit further comprises a memory that stores the overcurrent detection threshold value.

13. The energy storage apparatus of claim 8, further comprising:
an assembled battery connected between current detection resistor and the current shutoff device in the current path.

14. The energy storage apparatus of claim 13, further comprising:
a positive electrode terminal unit, the current shutoff device being formed in the current path between the assembled battery and the positive electrode terminal unit.

15. The energy storage apparatus of claim 14, wherein the battery management unit further comprises a voltage detection circuit that detects a voltage of the assembled battery, and
wherein the CPU monitors the voltage of the assembled battery and if the CPU detects an abnormality in the voltage of the assembled battery, then the CPU causes the current shutoff device to shut off the energization between the assembled battery and the positive electrode terminal unit.

16. The overcurrent detection device according to claim 1, further comprising:
a current shutoff device that shuts off a current in a current path when the current is equal to or greater than an overcurrent detection threshold value.

17. The overcurrent detection device according to claim 16, wherein the current is determined to be equal to or greater than the overcurrent detection threshold value based on an output of the current detection circuit.

* * * * *